United States Patent
Joe

(10) Patent No.: US 10,793,212 B2
(45) Date of Patent: Oct. 6, 2020

(54) BICYCLE HANGER FOR HUNG STORAGE OF A BICYCLE BY ITS SEAT AND SEAT POST

(71) Applicant: Thomas Peter Joe, Winnipeg (CA)

(72) Inventor: Thomas Peter Joe, Winnipeg (CA)

( * ) Notice: Subject to any disclaimer, the term of this patent is extended or adjusted under 35 U.S.C. 154(b) by 0 days.

(21) Appl. No.: 16/710,283

(22) Filed: Dec. 11, 2019

(65) Prior Publication Data

US 2020/0189676 A1 Jun. 18, 2020

Related U.S. Application Data

(60) Provisional application No. 62/778,368, filed on Dec. 12, 2018.

(51) Int. Cl.
B62H 3/12 (2006.01)

(52) U.S. Cl.
CPC .......... B62H 3/12 (2013.01); *B62H 2700/00* (2013.01)

(58) Field of Classification Search
CPC ........ B62H 3/12; B62H 3/00; B62H 2700/00; F16B 45/00
USPC ..... 211/17–24; 248/339, 304, 215, 322, 692
See application file for complete search history.

(56) References Cited

U.S. PATENT DOCUMENTS

| | | | | |
|---|---|---|---|---|
| 580,032 A | * | 4/1897 | Bierbach | B62H 3/12 211/17 |
| D28,153 S | * | 1/1898 | Woodward | D12/115 |
| 684,312 A | * | 10/1901 | Rush | F16B 15/04 248/216.1 |
| D229,166 S | * | 11/1973 | Generalis | D12/115 |
| D235,427 S | * | 6/1975 | Generalis | D12/115 |
| D239,072 S | * | 3/1976 | Adams | D6/681 |
| D240,351 S | * | 6/1976 | Generalis | D8/371 |
| D244,512 S | * | 5/1977 | Edwards | D12/115 |
| 4,176,580 A | * | 12/1979 | Gallegos | G10G 5/00 248/224.51 |
| D285,529 S | * | 9/1986 | Huxhold | 248/304 |
| 4,676,413 A | * | 6/1987 | Began | B60R 9/10 224/493 |
| 4,821,890 A | * | 4/1989 | Hills | B62H 3/12 211/113 |
| 5,067,641 A | * | 11/1991 | Johnson | B60R 9/06 224/501 |
| 5,078,276 A | * | 1/1992 | Rogge | B62H 3/12 211/18 |

(Continued)

*Primary Examiner* — Jonathan Liu
*Assistant Examiner* — Devin K Barnett
(74) *Attorney, Agent, or Firm* — Kyle R Satterthwaite; Ryan W Dupuis; Ade & Company Inc

(57) ABSTRACT

A bicycle hanger for storing a bicycle in an elevated and suspended state features a support configuration that comprises a set of three support members, including a front support member spanning across a seat of a bicycle at an underside thereof in front of a seat post of said bicycle, an intermediate support member spanning across said seat post of said bicycle at a front side of said seat post, and a rear support member spanning across said seat post of said bicycle at a rear side of said seat post. In one embodiment, the intermediate support member is respectively connected to the front and rear support members by linking members extending from opposite ends of the intermediate member, thereby collectively imparting an S-shape layout to the support configuration.

11 Claims, 3 Drawing Sheets

(56) References Cited

U.S. PATENT DOCUMENTS

| | | | | |
|---|---|---|---|---|
| 5,086,930 A * | 2/1992 | Saeks | B62H 3/12 | 211/17 |
| D327,458 S * | 6/1992 | Martinell | D12/115 | |
| D329,372 S * | 9/1992 | Wilms | D8/363 | |
| D331,734 S * | 12/1992 | Rankin | D12/115 | |
| D344,868 S * | 3/1994 | Martinell | D6/552 | |
| 5,498,015 A * | 3/1996 | Trout | B62H 3/00 | 211/22 |
| 5,553,718 A * | 9/1996 | Robar | B62H 3/00 | 211/18 |
| 5,573,165 A * | 11/1996 | Bloemer | B60R 9/06 | 224/523 |
| 5,575,446 A * | 11/1996 | Swenson | A47G 33/10 | 248/304 |
| 5,664,687 A * | 9/1997 | Liatti | B62H 3/12 | 211/118 |
| 6,302,365 B1 * | 10/2001 | Catanzarite | A47G 25/0614 | 248/215 |
| 6,446,816 B1 * | 9/2002 | Miller | B62H 3/12 | 211/5 |
| D493,094 S * | 7/2004 | Goodman | D8/372 | |
| 7,225,933 B1 * | 6/2007 | Pollock | B62H 3/12 | 211/118 |
| 7,350,756 B2 * | 4/2008 | Woltmann | A01K 15/025 | 24/546 |
| 7,448,582 B2 * | 11/2008 | Jackson | A47F 5/0838 | 248/215 |
| 7,516,929 B2 * | 4/2009 | Brustein | A47G 29/083 | 248/304 |
| D617,998 S * | 6/2010 | Goodman | D6/323 | |
| 8,905,093 B2 * | 12/2014 | Cloud | B67D 7/50 | 141/390 |
| 10,099,738 B2 * | 10/2018 | Beneke | B62H 3/12 | |
| D858,261 S * | 9/2019 | Gong | D8/367 | |
| 2002/0038844 A1 * | 4/2002 | Miller | B62H 3/12 | 248/322 |
| 2002/0134742 A1 * | 9/2002 | Huang | F16M 13/027 | 211/17 |
| 2004/0050807 A1 * | 3/2004 | Cheng | B62H 3/12 | 211/17 |
| 2007/0108357 A1 * | 5/2007 | Plowman | F16B 45/00 | 248/304 |
| 2008/0272264 A1 * | 11/2008 | Carlson | F16M 11/242 | 248/354.4 |
| 2010/0078541 A1 * | 4/2010 | Fathi | A44B 15/005 | 248/339 |
| 2012/0061540 A1 * | 3/2012 | Platt | F16B 45/00 | 248/225.21 |
| 2013/0126453 A1 * | 5/2013 | Flickinger | A47F 7/00 | 211/85.3 |
| 2013/0306823 A1 * | 11/2013 | Liu | A47G 29/083 | 248/339 |
| 2015/0122749 A1 * | 5/2015 | Diorio | B62H 5/10 | 211/5 |
| 2015/0314820 A1 * | 11/2015 | Fournier | B62H 5/003 | 70/62 |
| 2018/0345995 A1 * | 12/2018 | Deason | B62H 3/08 | |
| 2019/0210675 A1 * | 7/2019 | Clark | B62H 3/12 | |

* cited by examiner

BICYCLE HANGER FOR HUNG STORAGE OF A BICYCLE BY ITS SEAT AND SEAT POST

CROSS-REFERENCE TO RELATED APPLICATIONS

This application claims benefit under 35 U.S.C. 119(e) of U.S. Provisional Application No. 62/778,368, filed Dec. 12, 2018, the entirety of which is incorporated herein by reference.

FIELD OF THE INVENTION

The present invention relates generally to bicycle storage, and more particularly to devices for hanging support of bicycles.

BACKGROUND

There exists a need in the marketplace for bicycle storage solutions that don't occupy precious floor space, for example in garages, apartments and other environments. In response, applicant has designed a unique bicycle hanger of simple, minimalist construction, and by which a bicycle can be stored in a suspended manner occupying zero floor space.

SUMMARY OF THE INVENTION

According to one aspect of the invention, there is provided a bicycle hanger for storing a bicycle in an elevated and suspended state, said bicycle hanger comprising a support configuration that comprises a set of three support members, including a front support member configured to span across a seat of a bicycle at an underside thereof in front of a seat post of said bicycle, an intermediate support member configured to span across said seat post of said bicycle at a front side of said seat post, and a rear support member configured to span across said seat post of said bicycle at a rear side of said seat post.

According to another aspect of the invention, there is provided a method of storing a bicycle comprising hanging said bicycle from a bicycle hanger comprising a front support member spanning across a seat of said bicycle at an underside in front of a seat tube of said bicycle, an intermediate support member spanning across said seat tube of said bicycle at a front side of said seat tube, and a rear support member spanning across said seat tube of said bicycle at a rear side of said seat tube.

BRIEF DESCRIPTION OF THE DRAWINGS

One embodiment of the invention will now be described in conjunction with the accompanying drawings in which.

DETAILED DESCRIPTION

Figure 1:
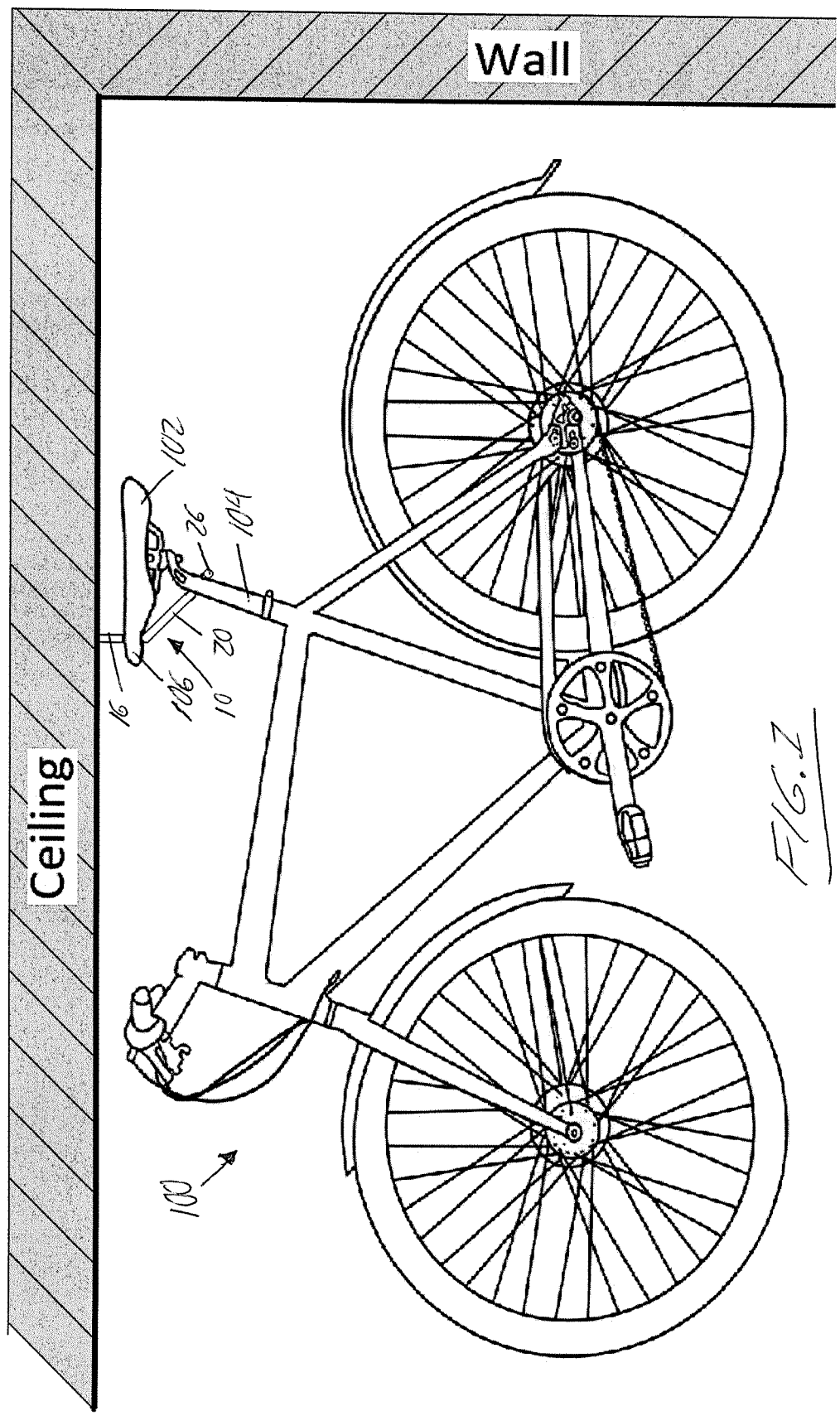
FIG. 1 is a side elevational view illustrating suspended storage of a bicycle by a ceiling mounted bicycle hanger according to a preferred embodiment of the present invention.
Figure 2:
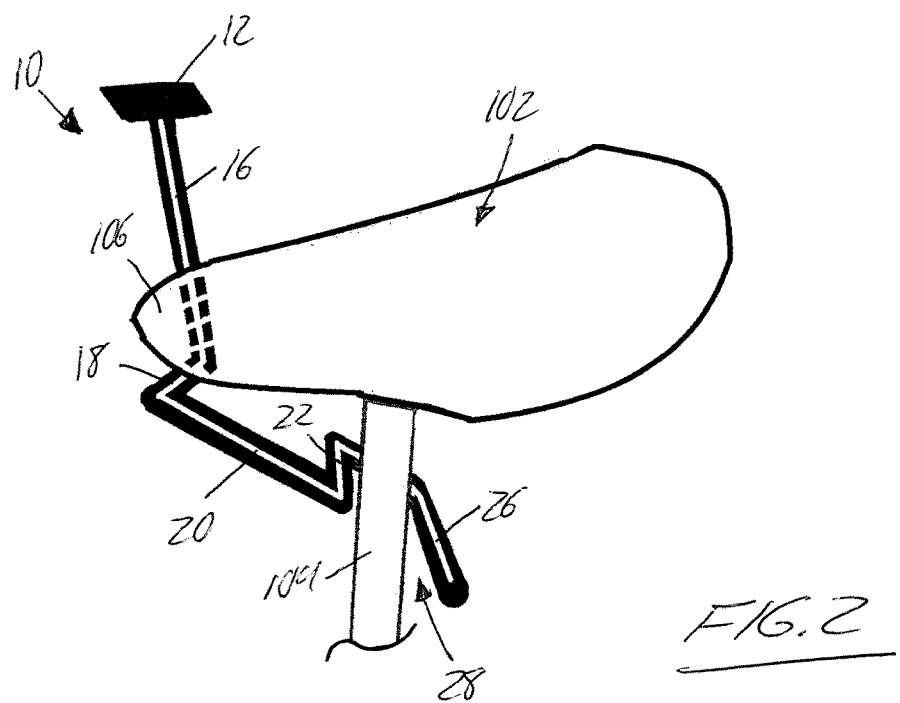
FIG. 2 is perspective view illustrating engagement of the bicycle hanger with the seat and seat post of the bicycle.

The appended drawings show a unique bicycle hanger 10 by which a bicycle 100 can be stored in a suspended condition elevated above ground in a more horizontal than vertical orientation, and in a manner supported solely by contact of the hanger with the seat 102 and seat post 104 of the bicycle.

The hanger features a ceiling mount 12, for example in the form of a flat metal plate having at least one fastening hole 14 therein through which the ceiling mount can be attached to the ceiling of a garage, house, apartment, office or other static structure by driven engagement of at least one threaded fastener through the fastening hole 14 into a structural component of the ceiling (e.g. joist, rafter, truss, etc.).

A bicycle support configuration 16 is affixed to an underside of the ceiling mount to depend downwardly therefrom in the installed position of the hanger. The support configuration of the illustrated embodiment is an elongated multi-bar unit assembled from a series of welded-together metal bar segments, one of which is welded to the flat metal plate of the ceiling mount to suspend the remainder of the support configuration therefrom via a singular attachment thereto. This mount-attached segment is referred to herein as a leg 16 of the support configuration, and reaches downwardly from the underside of the ceiling mount in a first vertical plane.

At a bottom end of this leg 16, a front support member 18 is affixed thereto and extends horizontally and laterally therefrom in a transverse direction lying perpendicularly cross-wise to the first vertical plane. At a distal end of this front support member 18 furthest from the leg 16, a first linking member 20 is affixed to the front support member, and angles downwardly and rearwardly therefrom in perpendicular relation thereto in a second vertical plane parallel to the first vertical plane in which the leg 16 resides.

At a distal end of this first linking member 20 furthest from the front support member 18, an intermediate support member 22 is affixed to the first linking member, and reaches horizontally therefrom back toward the first vertical plane in which the leg 16 resides. This intermediate support member 22 lies in parallel relation to the front support member 18 and perpendicular relation to the first linking member.

At a distal end of this intermediate support member 22 furthest from the first linking member 20, a second linking member 24 is affixed to the intermediate support member 22, and reaches rearwardly therefrom in a third vertical plane parallel to the first and second vertical planes occupied by the leg 16 and first linking member 20. As shown, the second linking member may slope obliquely downward in parallel relation to the first linking member 20. In the illustrated example, the intermediate support member is shorter than the front support member, and so the third vertical plane occupied by the second linking member is located intermediately of the first and second vertical planes occupied by the leg and first linking member, but in another example, the front an intermediate support members may be of equal length to the front support member so that the second linking member occupies the same vertical plane as the leg. In other words, the first and third vertical planes may be different from one another, like in the illustrated example, or coincident with one another in other examples.

Finally, a rear support member 26 is affixed to a distal end of the second linking member 24 furthest from the intermediate support member, and reaches horizontally therefrom away from the first and third vertical planes and toward, and optionally past, the second vertical plane. The rear support member lies in parallel relation to the front and intermediate support members 18, 22.

Figure 3:
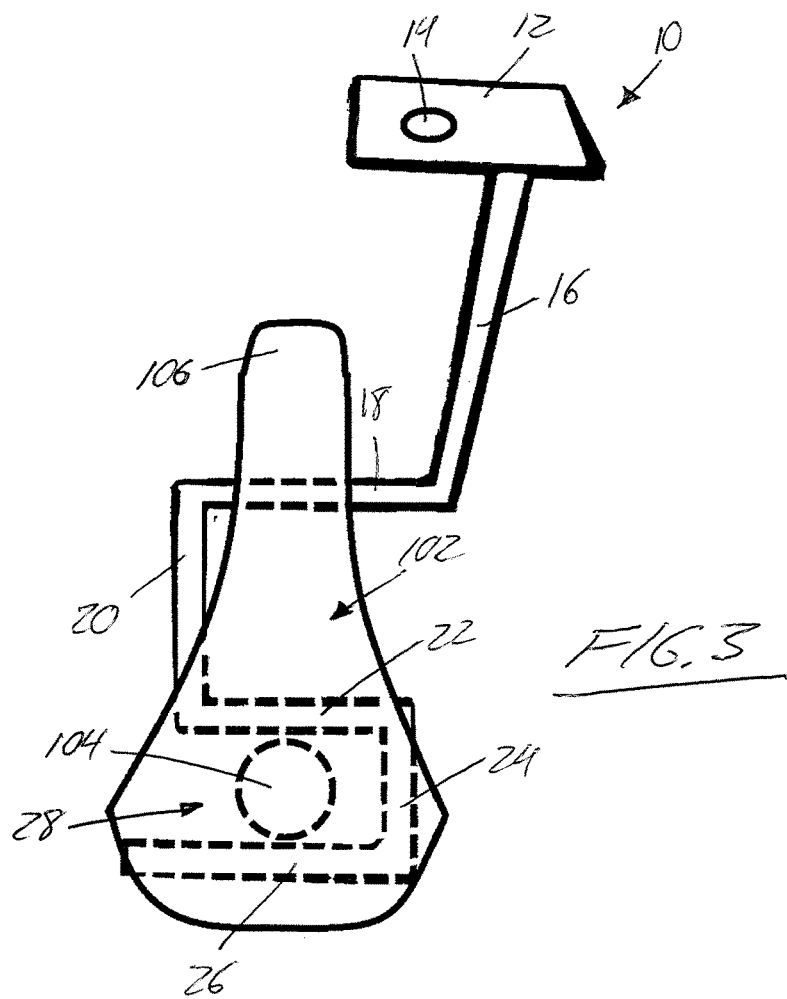
FIG. 3 is an overhead plan view of the bicycle hanger, seat and seat post of FIG. 2.

From the forgoing, and with reference to FIG. 3, it can be seen that the support configuration features five metal bar segments perpendicularly fixed together to form the front, intermediate and rear support members and the two linking members joined therebetween, and thereby forms a rigid S-shaped assembly, while a final sixth metal bar segment is affixed to the ceiling mount to hang the S-shaped assembly therefrom. In the S-shaped assembly, a gap space 28 left between the intermediate and rear support members 22, 26 is open at the side of the S-shaped assembly opposite the leg 16 in order to accommodate sliding insertion of the seat post 104 of the bicycle into this gap space 28 through the open end thereof, so that the intermediate support member 22 and parallel rear support member 26 lie across the seat post at the front and rear sides thereof, respectively. Meanwhile, a nose 106 of the bicycle seat 102 projects forwardly from the seat post 104 overtop of the front support member 18 to hang the bicycle therefrom.

The bicycle is thus suspended by the nose 106 of the seat 102, with the weight of the bicycle borne by the front support member 18 of the hanger, while the seat post 104 is captured between the intermediate and rear support members 22, 26 in a manner constraining the seat post 104 against forward or rearward movement, thus stabilizing the bicycle in a static position. The rear support member 26 prevents rearward sliding of the seat nose 106 off the front support member 18 by blocking reward movement of the seat post 104, while the intermediate support member 22, by blocking forward movement of the seat post 104, prevents the rear-heavy bicycle from swinging about a fulcrum point atop the front cross-member 18.

All three support members 18, 22, 26 of the hanger lie horizontally and perpendicularly cross-wise to a vertical reference plane that lies intermediate of the first and third vertical planes of the hanger, and that longitudinally bisects the bicycle seat and is occupied by the bicycle frame and seat post. The three support members are spaced apart in this longitudinal direction of the bicycle, with the front support member at greater elevation than the intermediate and rear support members to receive the underside of the bicycle seat at an elevation above where the seat post is embraced by the intermediate and rear support members. Through this geometry, the three support member's cooperatively support the bicycle in a stable, and more horizontal than vertical orientation. That is, in the bicycle's hanging position, the two wheel axes of the bicycle lie a shared plane that is more horizontally oriented than vertical, unlike some known prior art wall-mounted bicycle hangers of a type hanging the bicycle in a vertically upright orientation by its front wheel.

In the illustrated embodiment, the fastening hole 14 in the ceiling mount 12 is located to the same side of the leg 16 to which the front support member 18 extends to reduce a transverse horizontal distance from the fastening hole to the load-bearing point at which the weight of the bicycle is carried on the front support member, thus reducing torque loading on the hanger's attachment to the ceiling. In flat-ceiling mounting conditions like that of the illustrated example, the generally perpendicular relation of the leg 16 to the ceiling mount helps minimize material requirements by minimizing the leg length necessary to leave sufficient clearance space to accommodate the bicycle seat between the support members and the ceiling, and helps reduce a longitudinal horizontal distance between the fastening hole and the load-bearing point to minimize torque loading of the ceiling attachment in the other direction. A variation of the hanger intended for attachment to sloped rafters in a vaulted ceiling application may employ a less perpendicular angle between the ceiling mount and the leg 16 so that the leg again hangs generally vertically from the mount in the installed position of the hanger despite attachment of the mount to a sloped rafter.

Figure 4:
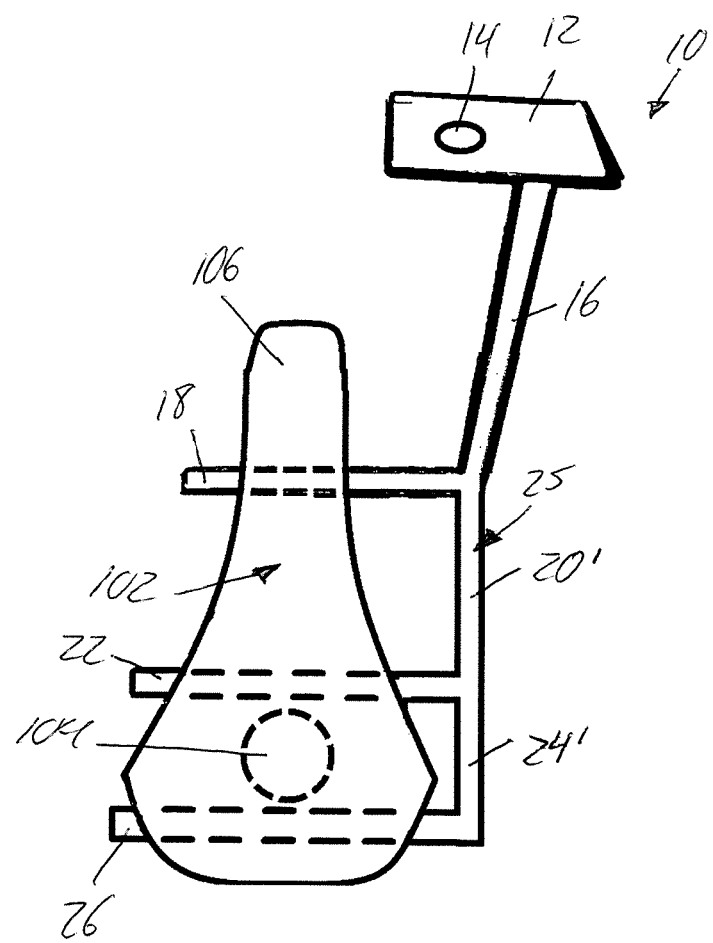
FIG. 4 is an overhead plan view similar to FIG. 3, but showing a variant of the bicycle hanger.

While the particular embodiment detailed herein uses welded-together, linear bar segments for the support members and interconnected linking members, it will be appreciated that the particular materials, shapes and fabrication techniques may be varied. In one alternative, singular bar may be bent into the described and illustrated S-shape configuration and connected hanging leg 16. While the forgoing example uses an S-shaped layout in which a pair of linking members join the intermediate support member to the other support members at opposite ends of the intermediate support member, an alternative example shown in FIG. 4 instead employs an E-shaped layout. Here, the intermediate support member 22 is connected to the other two support members 18, 26 at the same end, whereby the two linking members 20',24' cooperatively form a longer singular linking member 25 that reaches rearward from the lower end of the leg 16 and interconnects all three support members 18, 22, 26 from one side thereof.

Also, while the preferred embodiment employs a ceiling mount, other embodiments may have a wall mount, for example where a vertically oriented wall plate replaces not only the horizontally oriented ceiling mounting plate 12 of the illustrated embodiment, but also replaces the downwardly hanging leg 16 and two linking members The wall-mounted plate in such alternative embodiments is fastened to one or more wall studs of an upright wall, and the three support members are three separate components each respectively affixed to the wall-mounted plate to project laterally outward therefrom. However, wall mounted embodiments have less flexibility in terms of where they can be mounted in a room or garage space, and require notably longer support members due to the need while leaving sufficient clearance space between the wall and the seat-supporting area of the hanger to accommodate the handlebar and pedal on the wall-facing side of the bicycle. Nonetheless, the same three-point support of the bicycle at the underside of the seat nose and the front and rear of the seat post may be used in a wall-mounted hanger context, or in any context regardless of how the three-point support configuration is held in place in an elevated state above ground or floor level.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A bicycle hanger for storing a bicycle in an elevated and suspended state from a ceiling, said bicycle hanger comprising
   a top plate configured to be mounted to the ceiling, a leg extending downwardly from the top plate,
   a front support member extending generally perpendicularly from a bottom end of the leg, the front support member configured to span across an underside of a seat of a bicycle in front of a seat post of said bicycle, an intermediate support member configured to span across a front side of said seat post of said bicycle, and a rear support member configured to span across a rear side of said seat post of said bicycle,
   a first linking member that extends between and connects the front support member to the intermediate support member, a second linking member that extends between and connects the intermediate support member to the rear support member, wherein the front support member, the first linking member, the intermediate support member, the second linking member, and the rear support member combined forms an S-shaped structure that is sloped relative to the leg.

2. The bicycle hanger of claim 1, wherein the front support member, the intermediate support member, and the rear support member are parallel to one another.

3. The bicycle hanger of claim 1, wherein the intermediate support member is connected to the front support member from a first end of said intermediate support member, and the rear support member is connected to the intermediate support member from a second opposite end of said intermediate support member.

4. The bicycle hanger of claim 1, wherein the front support member resides at greater elevation than both the intermediate support member and the rear support member.

5. The bicycle hanger of claim 1, wherein the intermediate support member resides at greater elevation than the rear support member.

6. The bicycle hanger of claim 1, wherein said top plate is a ceiling mount.

7. The bicycle hanger of claim 1, wherein, when in use, said bicycle is suspended with the seat post of said bicycle being generally vertically oriented with the seat and wheels of the bicycle being horizontally oriented.

8. The bicycle hanger of claim 1, wherein the top plate is mounted to a static structure.

9. The bicycle hanger of claim 1, wherein the top plate is mounted to a ceiling of a garage.

10. The bicycle hanger of claim 1, in combination with a bicycle hanging therefrom in a horizontal orientation, wherein wheel axes of said bicycle reside in a shared plane.

11. A method of storing a bicycle comprising the steps of:
providing the bicycle hanger of claim 1,
hanging said bicycle from the bicycle hanger.

* * * * *